(No Model.)
N. W. HASKINS.
TROLLEY.
No. 525,015. Patented Aug. 28, 1894.
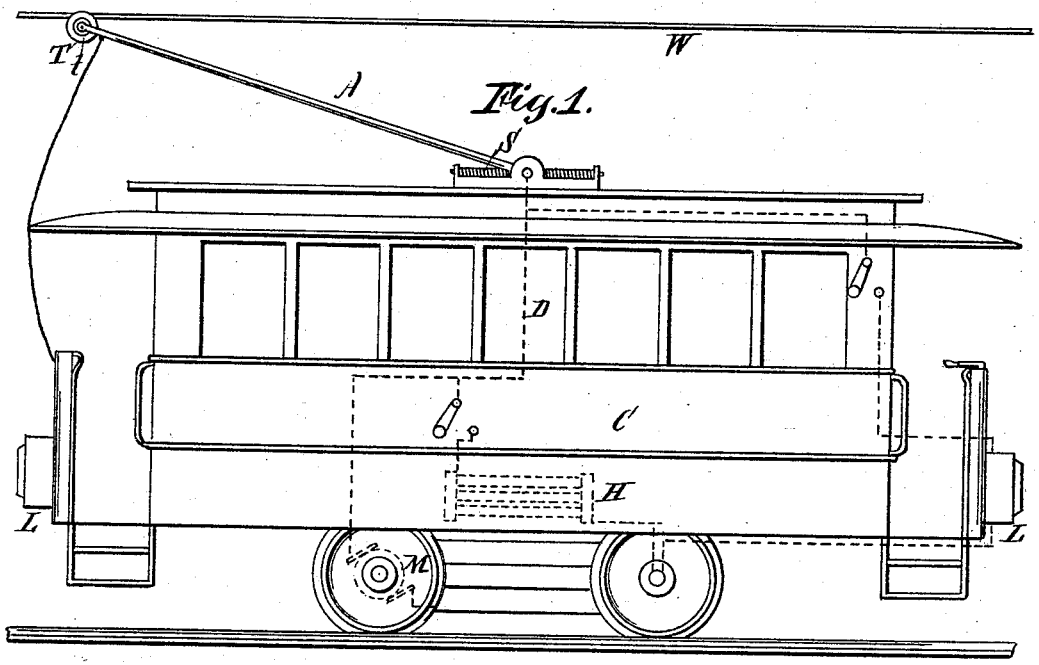
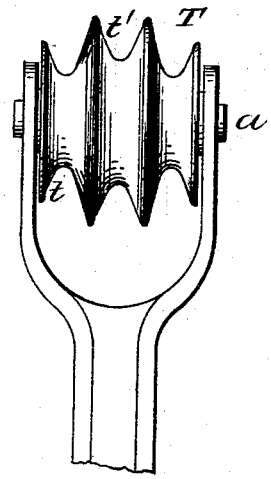
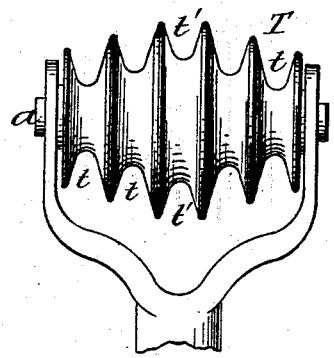
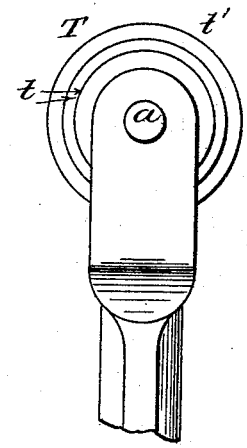
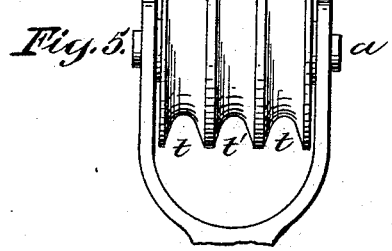
Witnesses:
D. W. Gardner.
L. H. Cornish.
Inventor:
Naaman W. Haskins,
By his Attorney
George William Miatt

UNITED STATES PATENT OFFICE.

NAAMAN W. HASKINS, OF BROOKLYN, NEW YORK.

TROLLEY.

SPECIFICATION forming part of Letters Patent No. 525,015, dated August 28, 1894.

Application filed December 1, 1893. Serial No. 492,454. (No model.)

*To all whom it may concern:*

Be it known that I, NAAMAN W. HASKINS, a citizen of the United States, residing in the city of Brooklyn, in the county of Kings and State of New York, have invented certain new and useful Improvements in Trolleys, of which the following is a specification, sufficient to enable others skilled in the art to which the invention appertains to make and use the same.

The main object of my invention is to insure the continuous contact of the trolley with the electric wire or conductor under all the varying conditions of traffic. As heretofore constructed the trolley is apt to leave the wire under the influence of sudden jar or vibration, or while going around a curve, &c., resulting in delay and even danger, since the trolley arm almost invariably is brought into contact with the electric wire and if the contact is not soon broken the copper wire is burned through and falls apart, endangering the lives of those in the vicinity. Even if this does not happen the trolley arms, if the trolley jumps the wire, are apt to be broken by striking against cross wires or guys, &c., or to break the latter instead.

My invention consists of a trolley formed with a plurality of parallel grooves at right angles to a common longitudinal axis, the flanges of each groove constituting an independent contact holder for the power wire when brought into engagement therewith. As a result of the continuous contact thus attained the dangers and delays of travel are mainly obviated, and it is possible to utilize electricity from the main wire in both heating and lighting the car,—a desideratum not heretofore practicable on account of the uncertainty of the contact between trolley and wire. The use of electricity for the head light is especially desirable, but all attempts have heretofore been unsatisfactory for the reasons stated.

In the accompanying drawings, Figure 1, is a diagrammatic representation of a car, with motor, &c., provided with my improved trolley. Fig. 2, is an elevation of the upper end of the trolley arm provided with my new bearing. Fig. 3, is a view at right angles to Fig. 2. Figs. 4 and 5, are views similar to Fig. 2, showing modifications in the form of trolley.

The car C, is represented symbolically as being provided with the electric motor M, an electric heating device H, and an electric head light L, each in a separate circuit but all connected with the main conductor D, leading from the trolley arm A.

The trolley arm A, is held upward to press the trolley T, against the wire W, by the springs S, or other equivalent or well known means.

The trolley T, is formed with two or more bearing grooves $t$, $t$, $t$, arranged at right angles to a common axis $a$.

A desirable arrangement is that shown in Figs. 2, 3 and 4, in which a central or main bearing groove $t'$ is supplemented by one or more bearing grooves on each side of less radius. The grooves may however be made of like radius as indicated in Fig. 5, and will accomplish the same result.

In operation, while the sides of the main bearing groove $t'$ are in contact with the wire W, under normal conditions, the outer grooves $t$, $t$, receive and engage the wire W, whenever the trolley loses its proper alignment, by reason of jar, twist or otherwise, and maintain the electrical contact until the trolley is returned to its normal position.

I am aware that spiral grooves have been formed on either side of central grooves on trolleys, as in Patents No. 478,410 of July 5, 1892, and No. 511,763 of January 2, 1894; also that a central pulley has been provided with independently rotating side flanges formed to guide the wire into the central grove of the trolley. I do not seek to cover means for returning the wire to the central groove of the trolley, nor is this the object of my invention.

What I claim as my invention, and desire to secure by Letters Patent, is—

A trolley for engagement with a single electric conductor consisting of a plurality of grooved annular bearings formed at right angles to a common axis, the side walls of each groove forming a separate bearing capable of transmitting the current to an electrical conductor common to all the flanges, for the purpose and substantially in the manner described.

NAAMAN W. HASKINS.

Witnesses:
GEORGE WILLIAM MIATT,
D. W. GARDNER.